US011254305B2

(12) United States Patent
Jeong et al.

(10) Patent No.: US 11,254,305 B2
(45) Date of Patent: Feb. 22, 2022

(54) APPARATUS FOR CONTROLLING PARKING OF A VEHICLE, A SYSTEM HAVING THE SAME, AND A METHOD THEREOF

(71) Applicants: HYUNDAI MOTOR COMPANY, Seoul (KR); KIA MOTORS CORPORATION, Seoul (KR)

(72) Inventors: Sun Woo Jeong, Suwon-si (KR); Yong Joon Lee, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 151 days.

(21) Appl. No.: 16/656,186

(22) Filed: Oct. 17, 2019

(65) Prior Publication Data

US 2021/0009110 A1 Jan. 14, 2021

(30) Foreign Application Priority Data

Jul. 12, 2019 (KR) ........................ 10-2019-0084430

(51) Int. Cl.
*B60W 30/06* (2006.01)
*G06K 9/00* (2022.01)

(52) U.S. Cl.
CPC ......... *B60W 30/06* (2013.01); *G06K 9/00812* (2013.01); *G06K 9/00825* (2013.01); *B60W 2554/00* (2020.02)

(58) Field of Classification Search
CPC ............ B62D 15/0285; B62D 15/0275; B60T 2201/10; B60R 2300/806; G06K 9/00812; B60W 30/06
See application file for complete search history.

(56) References Cited

U.S. PATENT DOCUMENTS

| | | | | |
|---|---|---|---|---|
| 2010/0114434 A1* | 5/2010 | Kawabata | B60R 1/00 701/41 |
| 2017/0129486 A1* | 5/2017 | Nakada | B60W 10/20 |
| 2017/0355307 A1* | 12/2017 | Ha | H04N 7/183 |
| 2018/0370566 A1* | 12/2018 | Kojo | G06K 9/00812 |
| 2019/0303691 A1* | 10/2019 | Maeda | G06K 9/629 |
| 2020/0094817 A1* | 3/2020 | Matsuoka | G06K 9/00812 |
| 2020/0117926 A1* | 4/2020 | Kim | G08G 1/145 |
| 2020/0117927 A1* | 4/2020 | Oba | B62D 15/0275 |
| 2020/0290600 A1* | 9/2020 | Kuwahara | G06K 9/00798 |

* cited by examiner

*Primary Examiner* — Kenneth J Malkowski
(74) *Attorney, Agent, or Firm* — Lempia Summerfield Katz LLC

(57) ABSTRACT

An apparatus, a system including the apparatus, and a control method thereof, control parking of a vehicle. The apparatus includes a processor that recognizes a parking line or an object in a parking place, generates a reference line based on the parking line or the object, aligns the vehicle subject to the parking control based on the reference line, generates an expected driving path for a search for a parking place, and automatically searches for the parking place while the vehicle travels based on the expected driving path and storage that stores parking place information searched by the processor.

16 Claims, 15 Drawing Sheets

811 812
<801>

813 814
<802>

<701>

<702>

<901>

<902>

<1401>

<1402>

APPARATUS FOR CONTROLLING PARKING OF A VEHICLE, A SYSTEM HAVING THE SAME, AND A METHOD THEREOF

CROSS-REFERENCE TO RELATED APPLICATION

This application claims the benefit of priority to Korean Patent Application No. 10-2019-0084430, filed in the Korean Intellectual Property Office on Jul. 12, 2019, the entire contents of which are incorporated herein by reference.

TECHNICAL FIELD

The present disclosure relates to an apparatus for controlling parking of a vehicle, a system including the apparatus, and a method thereof, and more particularly, relates to a technology for automatically searching for a parking place.

BACKGROUND

Due to the development of various sensors and electronics for vehicles, vehicles having a driving assistance function of assisting a user to drive a vehicle and improving driving safety and convenience have attracted attention.

In particular, there is a growing interest in automatic vehicle parking technology for automatically performing parking in situations in which a user has difficulty. Accordingly, technologies for detecting a parking line using a sensor such as a camera and performing automatic parking in a parking place detected in the parking line have been developed. Remote smart parking assist systems have been developed using automatic parking technology.

A remote smart parking assist system in the related art may fail to search for a parking place when the system is out of range of a parking place search separation distance that is set for the system.

Furthermore, the remote smart parking assist system in the related art may incorrectly extract parking place information when searching for a parking place with the vehicle in a state of being misaligned with a parking place and a target vehicle or a column or with the vehicle in a turned state. Therefore, the number of parking steps may be increased, or an empty place may be incorrectly determined to be a parking place.

In addition, when searching for a parking place using an ultrasonic sensor, the remote smart parking assist system in the related art may fail to search for a small object while a vehicle travels at a predetermined speed or more. Alternatively, the system may incorrectly extract spatial information due to a smaller number of recognition points for a surrounding environment and may thus increase the number of parking steps.

SUMMARY

The present disclosure has been made to solve the above-mentioned problems occurring in the prior art while advantages achieved by the prior art are maintained intact.

An aspect of the present disclosure provides a parking control apparatus for automating a search for a parking place and for increasing the accuracy when searching for a parking place. The present disclosure also provides a system including the apparatus and a method thereof.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, an apparatus for controlling parking of a vehicle includes a processor that recognizes a parking line or an object in a parking place, generates a reference line based on the parking line or the object, aligns the vehicle subject to the parking control based on the reference line, generates an expected driving path for a search for the parking place, and automatically searches for the parking place while the vehicle travels based on the expected driving path and storage that stores parking place information searched by the processor.

In an embodiment, the processor may generate a virtual parking line by detecting an edge of a Y-axis parking line and may align the vehicle subject to the parking control based on the virtual parking line, when an X-axis parking line is not recognized and the Y-axis parking line is recognized.

In an embodiment, the processor may recognize bumper lines of parked vehicles, may generate the reference line based on the bumper lines of the vehicles, and may align the vehicle subject to the parking control based on the reference line, when an X-axis parking line is not recognized.

In an embodiment, the processor may generate an average value of the bumper lines of the vehicles as the reference line.

In an embodiment, the processor may calculate a separation distance between the vehicle subject to the parking control and the parking line and a required alignment angle for aligning the vehicle subject to the parking control. The processor may further calculate a required steering angle according to the separation distance and the required alignment angle. The processor may also control the alignment of the vehicle subject to the parking control according to the required steering angle.

In an embodiment, the processor may perform control such that the vehicle subject to the parking control searches for a parking place while travelling parallel to the parking line.

In an embodiment, the apparatus may further include a display that displays an expected movement path generated by the processor on a screen during the travel of the vehicle subject to the parking control.

In an embodiment, the processor may determine a parking mode of a vacant parking place by using at least one of the number of parking lines detected, whether an ellipse is detected or not, and an angle of a parking line.

In an embodiment, the processor may cause the vehicle to travel in the middle of a road during driving control for a search for a parking place and may continue to perform the driving control by changing a path to a path for evading an obstacle, when the obstacle is recognized.

In an embodiment, the processor may determine whether the obstacle moves, may cause the vehicle subject to the parking control to stand by when the obstacle moves, and may perform driving control of the vehicle subject to the parking control along the path for evading the obstacle, when the obstacle does not move.

In an embodiment, the processor may end an automatic parking place search mode and may perform engagement of a park (P) gear and engagement of an electronic parking brake (EPB), when the obstacle does not move, but a change into an evasion path is impossible or when a user intervenes.

In an embodiment, the apparatus may further include a display that outputs, for a predetermined period of time, a screen representing an immovable state and switches to and outputs an automatic parking place search mode screen, when the change into the evasion path is impossible.

In an embodiment, the processor may recognize a failure in automatic parking place search, when an end point of a parking line is recognized during driving control for a search for a parking place, and the display may display a screen representing the failure in the automatic parking place search.

In an embodiment, the processor may end an automatic parking place search mode and may perform control to engage P gear and an EPB, when a user intervenes.

According to another aspect of the present disclosure, a vehicle system includes: a sensing device that senses a parking place and a parking line; and a parking control apparatus that recognizes the parking line of the parking place, generates a reference line based on the parking line, aligns a vehicle subject parking control based on the reference line, generates an expected driving path for a search for the parking place, and automatically searches for a parking place based on the expected driving path.

According to another aspect of the present disclosure, a method for controlling parking of a vehicle includes: recognizing a parking line of a parking place; generating a reference line based on the parking line and aligning the vehicle subject to the parking control based on the reference line; generating an expected driving path for a search for the parking place; and automatically searching for a parking place based on the expected driving path.

In an embodiment, the recognizing of the parking line of the parking place may include generating a virtual parking line by detecting an edge of a Y-axis parking line, and generating the virtual parking line as the reference line, when an X-axis parking line is not recognized and the Y-axis parking line is recognized.

In an embodiment, the recognizing of the parking line of the parking place may include recognizing bumper lines of parked vehicles and generating a reference line based on the bumper lines of the vehicles, when an X-axis parking line is not recognized.

In an embodiment, the aligning of the vehicle subject to the parking control may include: calculating a separation distance between the vehicle subject to the parking control and the parking line and a required alignment angle for aligning the vehicle subject to the parking control; calculating a required steering angle according to the separation distance and the required alignment angle; and controlling the alignment of the vehicle subject to the parking control according to the required steering angle.

In an embodiment, driving control may continue to be performed by changing a path to a path for evading an obstacle, when the obstacle is recognized during the driving control for the parking place search.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
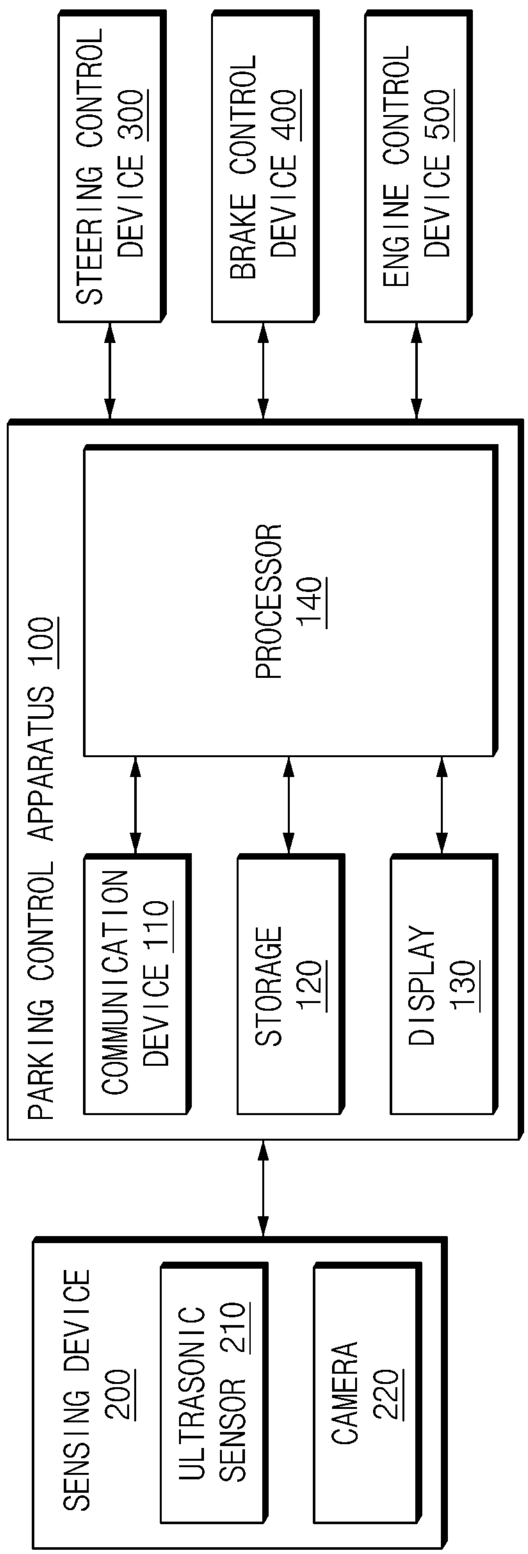
FIG. 1 is a block diagram illustrating a configuration of a vehicle system including a parking control apparatus according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

The present disclosure may be applied to remote smart parking assist (RSPA) technology.

Hereinafter, embodiments of the present disclosure are described in detail with reference to FIGS. 1-15.

FIG. 1 is a block diagram illustrating a configuration of a vehicle system that includes a parking control apparatus according to an embodiment of the present disclosure.

Referring to FIG. 1, the vehicle system according to the embodiment of the present disclosure may include a parking control apparatus 100, a sensing device 200, a steering control device 300, a brake control device 400, and an engine control device 500.

The parking control apparatus 100 may search for one or more parking places during parking control of a vehicle, may receive a selection of one of the parking places as a target parking place from a user, and may perform parking control toward the target parking place.

The parking control apparatus 100 may include a communication device 110, storage 120, a display 130, and a processor 140.

The communication device 110 is a hardware device that is implemented with various electronic circuits to transmit and receive signals via wireless or wired connection. In this disclosure, the communication device 110 may perform in-vehicle communication via CAN communication, LIN communication, or Ethernet communication. The communication device 110 may communicate with the sensing device 200, the steering control device 300, the brake control device 400, and the engine control device 500.

The storage 120 may store a sensing result of the sensing device 200, parking place information, an expected driving path for a search for a parking place, and a reference line of a parking place that are obtained by the processor 140. The storage 120 may include at least one type of storage medium among memories of a flash memory type, a hard disk type, a micro type, and a card type (e.g., a secure digital (SD) card or an eXtream digital (XD) card) and memories of a random access memory (RAM) type, a static RAM (SRAM) type, a read-only memory (ROM) type, a programmable ROM (PROM) type, an electrically erasable PROM (EEPROM) type, a magnetic RAM (MRAM) type, a magnetic disk type, and an optical disk type.

The display 130 may output, for a predetermined period of time, parking places, an expected movement path for a search for a parking place, and a screen representing an immovable state at the time when a change into an evasion path is impossible. The display 130 may switch to and display an automatic parking place search mode screen.

The display 130 may be implemented with a head-up display (HUD), a cluster, an audio video navigation (AVN), or the like. The display 130 may include at least one of a liquid crystal display (LCD), a thin film transistor-LCD (TFT LCD), a light emitting diode (LED) display, an organic LED (OLED) display, an active matrix OLED (AMOLED) display, a flexible display, a bended display, and a 3D display. Some of the displays may be implemented as a transparent display of a transparent or translucent type such that the outside can be viewed therethrough. Furthermore, the display 130 may be implemented with a touch screen including a touch panel and may be used as an input device as well as an output device.

The processor 140 may be electrically connected with the communication device 110, the storage 120, and the display 130 and may electrically control the components. The processor 140 may be electric circuitry that executes commands of software and may perform various data processing or computation, which are described below.

The processor 140 may recognize a parking line or an object in a parking place, may align a vehicle subject to parking control based on the parking line or the object, may generate an expected driving path for a search for a parking place, and may automatically search for a parking place based on the expected driving path.

When an X-axis parking line is not recognized and a Y-axis parking line is recognized, the processor 140 may generate a virtual parking line by detecting an edge of the Y-axis parking line and may align the vehicle subject to the parking control based on the virtual parking line.

When an X-axis parking line is not recognized, the processor 140 may recognize bumper lines of parked vehicles, may generate a reference line based on the bumper lines of the vehicles, and may align the vehicle subject to the parking control based on the reference line.

The processor 140 may generate the average value (or the middle value) of the bumper lines of the vehicles as a reference line.

The processor 140 may calculate the separation distance between the vehicle subject to the parking control and the parking line and a required alignment angle for aligning the vehicle subject to the parking control, may calculate a required steering angle according to the separation distance and the required alignment angle, and may perform control to align the vehicle subject to the parking control according to the required steering angle.

The processor 140 may perform control such that the vehicle subject to the parking control searches for a parking place while travelling parallel to the parking line.

The processor 140 may determine a parking mode of a vacant parking place by using at least one of the number of parking lines detected, whether an ellipse is detected or not, and the angle of a parking line. The parking mode may include a perpendicular parking mode, an angle parking mode, a parallel parking mode, or the like.

The processor 140 may cause the vehicle to travel in the middle of a road during driving control for a search for a parking place, and when an obstacle is recognized, the processor 140 may continue to perform the driving control by changing the path to a path for evading the obstacle.

The processor 140 may determine whether the obstacle moves. When it is determined that the obstacle moves, the processor 140 may cause the vehicle subject to the parking control to stand by. When the obstacle does not move, the processor 140 may perform driving control of the vehicle subject to the parking control along the path for evading the obstacle.

When the obstacle does not move, but a change into the evasion path is impossible or when the user intervenes, the processor 140 may perform engagement of a park (P) gear and engagement of an electronic parking brake (EPB) after ending the automatic parking place search mode.

When an end point of a parking line is recognized during driving control for a search for a parking place, the processor 140 may recognize a failure in automatic parking place search, and the display 130 may display an automatic parking place search failure screen.

When the user intervenes, the processor 140 may end the automatic parking place search mode and may perform control to engage the P gear and the EPB.

The processor 140 may determine an empty place among parking places based on detection of a circle, may generate a driving path toward the empty place, and may control the vehicle to move toward the empty place by tracking the driving path. Accordingly, the processor 140 may determine, in a position near the empty place, whether the empty place is an available parking area. When the empty place is determined to be an area where the vehicle cannot be parked, the processor 140 may generate a path along which the vehicle travels in the middle of a road and may search for a parking place while the vehicle travels in the middle of the road along the path.

The sensing device 200 may include a plurality of sensors to detect a parking place, a parking line, and an object outside the vehicle. To this end, the sensing device 200 may include an ultrasonic sensor 210 and a camera 220. Although not illustrated in FIG. 1, for a search for the parking place, the sensing device 200 may include a radar, a laser scanner and/or a corner radar, a LiDAR, an acceleration sensor, a yaw rate sensor, a torque measurement sensor and/or a wheel speed sensor, a steering angle sensor, or the like. Furthermore, the sensing device 200 may operate in conjunction with a surround video monitoring (SVM) system.

In this disclosure, the parking control apparatus 100 may search for a parking place by using the ultrasonic sensor 210, may determine a presence or absence of an obstacle by using the camera 220, and may estimate the current position of the vehicle for generation of a parking path by using the wheel speed sensor, the steering angle sensor, the ultrasonic sensor, or the like.

The steering control device 300 may be configured to control the steering angle of the vehicle. The steering control device 300 may include a steering wheel, an actuator operating in conjunction with the steering wheel, and a controller for controlling the actuator.

The brake control device 400 may be configured to control the brake of the vehicle and may include a controller for controlling the brake.

The engine control device 500 may be configured to control the engine of the vehicle and may include a controller for controlling the speed of the vehicle.

The steering control device 300, the brake control device 400, and the engine control device 500 move the vehicle to a target parking place in conjunction with the parking control apparatus 100.

The steering control device 300, the brake control device 400, and the engine control device 500 move and park the vehicle in a found parking place in conjunction with the parking control apparatus 100.

The present disclosure may overcome the limitation in the sensing distance of the ultrasonic sensor when the RSPA operates. The present disclosure may also overcome the problem that an actual vacant parking place is not detected due to driving biased to one side. The present disclosure may further overcome the problem that parking place information is incorrectly extracted and therefore a parking place where the vehicle cannot be parked is detected to be an available parking place.

Furthermore, the present disclosure may detect a lane and an obstacle through the camera and the ultrasonic sensor and may perform parking control in a direction parallel to the direction of the lane and movement control in an ultrasonic sensing range.

In addition, the present disclosure may perform center alignment return after evasion driving due to an obstacle during automatic parking search.

Figure 2:
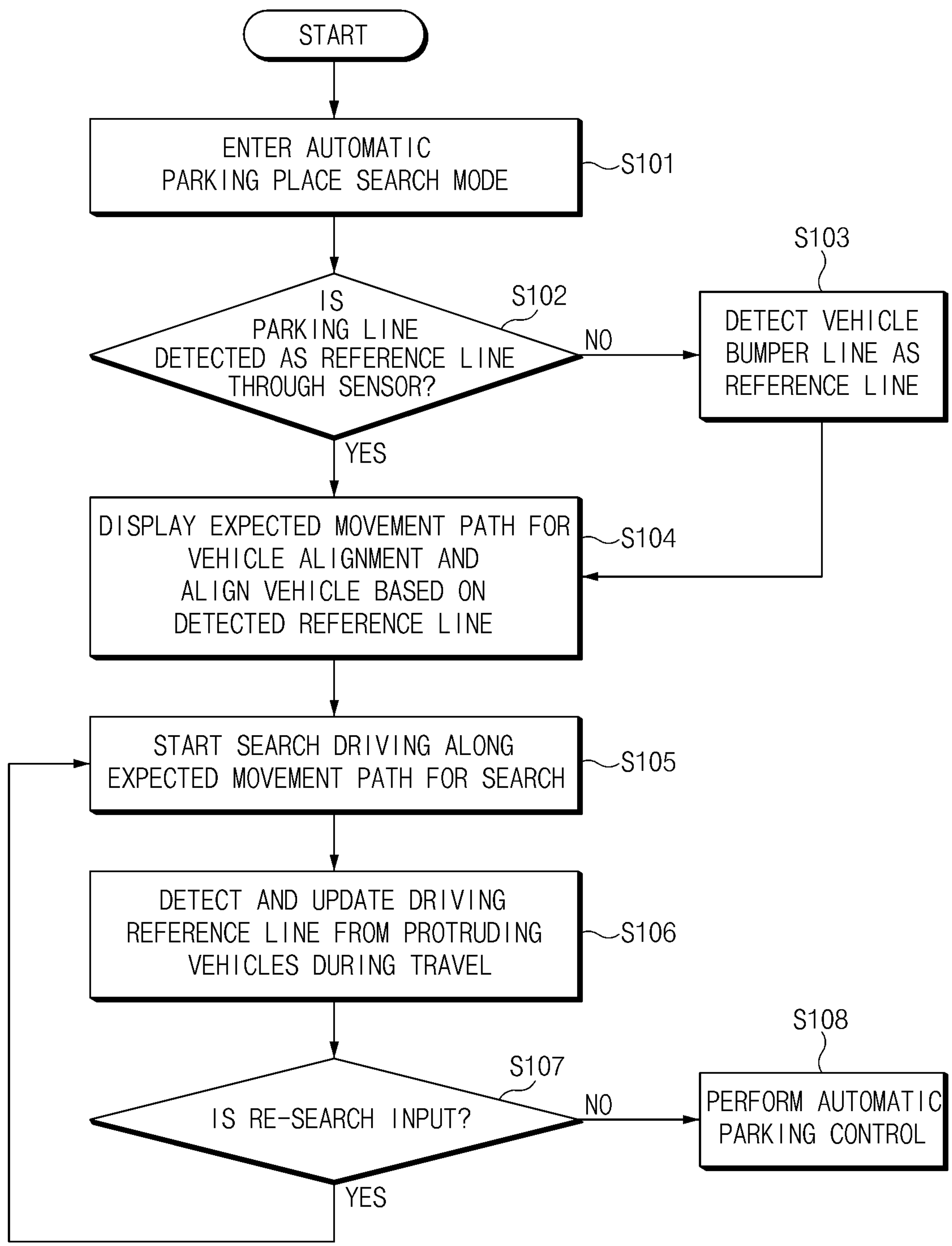
FIG. 2 is a flowchart illustrating a parking control method according to an embodiment of the present disclosure.
Figure 3:
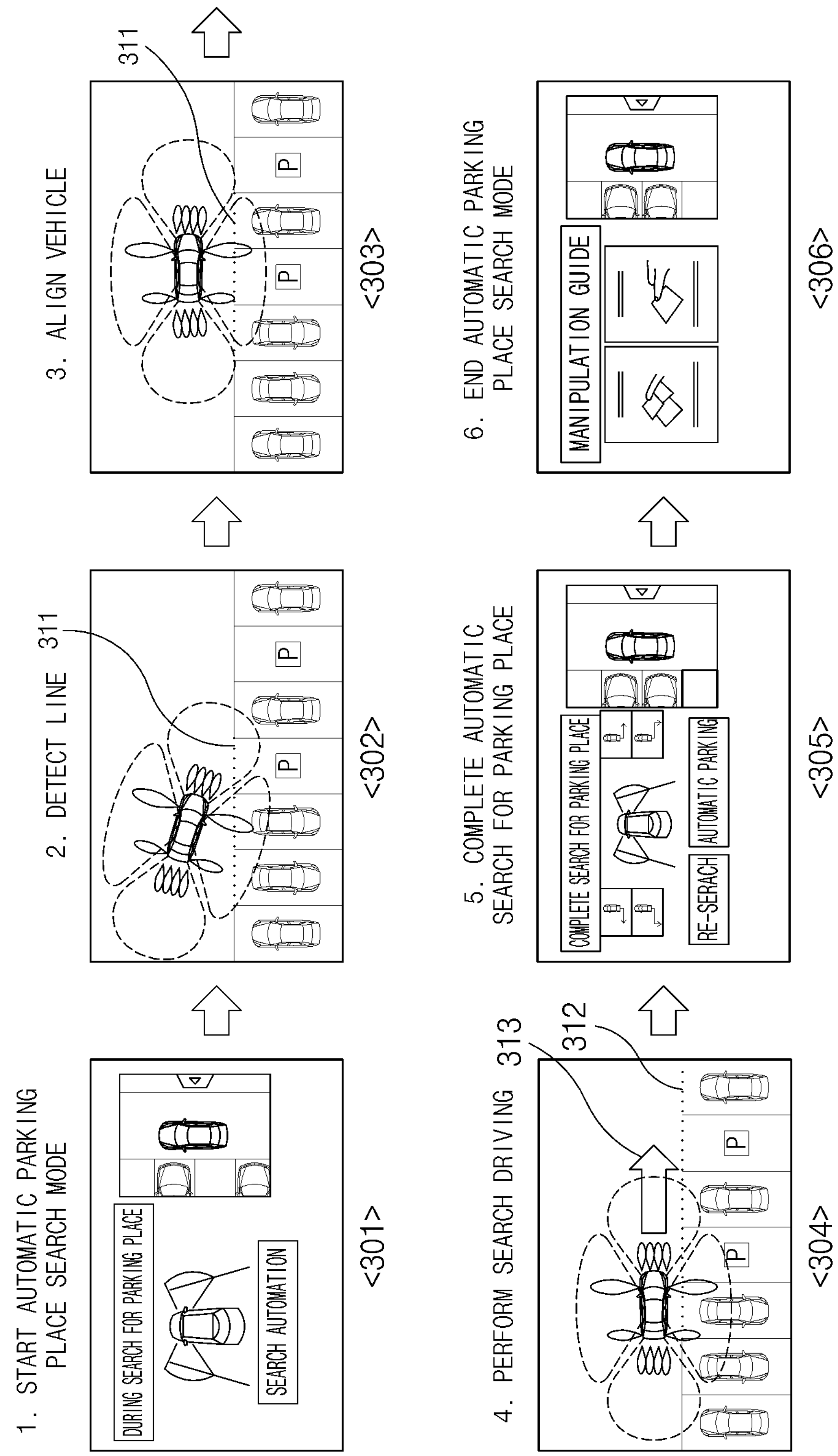
FIG. 3 is a view illustrating an automatic parking place search method according to an embodiment of the present disclosure.

Hereinafter, a parking control method according to an embodiment of the present disclosure is described in detail with reference to FIGS. 2 and 3. FIG. 2 is a flowchart illustrating a parking control method according to an embodiment of the present disclosure. FIG. 3 is a view illustrating an automatic parking place search method according to an embodiment of the present disclosure.

Hereinafter, it is assumed that the parking control apparatus 100 of FIG. 1 performs the process of FIG. 2. Furthermore, it may be understood that operations set forth as being performed by the apparatus in the description of FIG. 2 are controlled by the processor 140 of the parking control apparatus 100.

Referring to FIG. 2, the parking control apparatus 100 enters an automatic parking place search mode (S101). An automatic parking place search mode entrance screen is illustrated in <301> of FIG. 3.

The parking control apparatus 100 detects a parking line as a reference line by using the ultrasonic sensor 210 and the camera 220 of the sensing device 200 (S102). An example of detecting a parking line as a reference line 311 is illustrated in <302> of FIG. 3.

When no parking line is detected, the parking control apparatus 100 detects a vehicle bumper line of parked vehicles as a reference line (S103).

When a reference line is detected in process S102 or S103, the parking control apparatus 100 displays an expected path for aligning the vehicle based on the detected reference line and performs vehicle alignment control (S104). An example of aligning the vehicle parallel to the reference line 311 is illustrated in <303> of FIG. 3. Furthermore, for the alignment of the vehicle, the parking control apparatus 100 measures the separation distance between the vehicle and the reference line by using the front, rear, and side ultrasonic sensors 210 and calculates a required alignment angle. Moreover, the parking control apparatus 100 may measure entrance point coordinates through the camera 220 and may calculate an alignment angle. Accordingly, the parking control apparatus 100 may perform vehicle alignment based on the separation distance and the required alignment angle by the ultrasonic sensors 210 and the entrance point coordinates and the alignment angle by the camera 220.

The parking control apparatus 100 starts search driving control along an optimal path (S105). The parking control apparatus 100 displays an expected path for search driving on a screen and detects and updates a driving reference line from protruding vehicles during travel of the vehicle. A screen on which an updated reference line 312 is shown and an expected path arrow 313 is displayed is illustrated in <304> of FIG. 3.

When the automatic parking place search is completed, the parking control apparatus 100 displays a screen for inquiring the user as to whether to search for a parking place again or to perform automatic parking control and receives the user selection (S107). An example of the screen for inquiring the user as to whether to search for a parking place again or perform automatic parking control is illustrated in <305> of FIG. 3.

The parking control apparatus 100 continues to perform the search driving of process S105 when re-search is input. The parking control apparatus 100 enters an automatic parking control mode to perform automatic parking control when re-search is not input and an automatic parking control request is received (S108). A menu screen for ending the automatic parking place search mode and selecting one of a remote parking control mode and a smart parking control mode is illustrated in <306> of FIG. 3.

Figure 4:
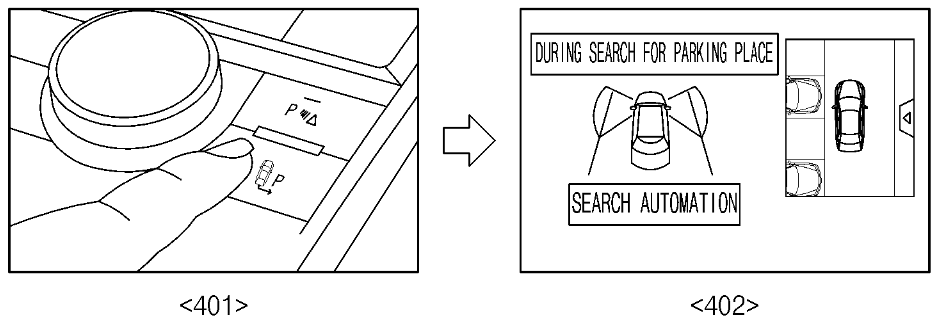
FIG. 4 is a view illustrating a process of entering an automatic parking place search mode according to an embodiment of the present disclosure.

FIG. 4 is a view illustrating a process of entering an automatic parking place search mode according to an embodiment of the present disclosure.

An example of entering an automatic parking place search mode by pressing a parking control button is illustrated in <401> of FIG. 4. An example of a screen on which an automatic parking place search menu is activated when the vehicle stops is illustrated in <402> of FIG. 4. The parking control apparatus 100 may automatically search for a parking place when receiving a selection of the automatic parking place search mode from the user. The user may directly search for a parking place when search automation is not selected.

Figure 5:
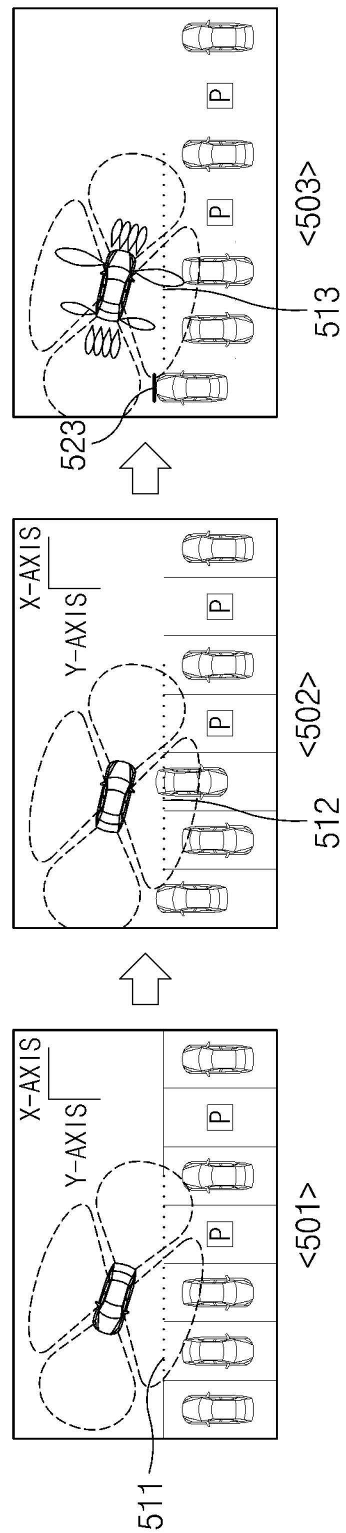
FIG. 5 is a view illustrating a process of detecting a reference line for vehicle alignment according to an embodiment of the present disclosure.

FIG. 5 is a view illustrating a process of detecting a reference line for vehicle alignment according to an embodiment of the present disclosure.

Referring to <501> of FIG. 5, the parking control apparatus 100 detects an X-axis parking line 511. As illustrated in <502> of FIG. 5, the parking control apparatus 100 detects a parking line edge and generates a virtual line 512 when there is no X-axis parking line and there is only a Y-axis parking line. Referring to <503> of FIG. 5, when there are no X-axis parking line and Y-axis parking line, the parking control apparatus 100 detects bumper lines 523 of parked vehicles and generates the middle value (or the average value) of the bumper lines of the vehicles as a reference line 513. The parking control apparatus 100 may detect a parking line by receiving obtained results from the ultrasonic sensor 210 and the camera 220 of the sensing device 200.

Figure 6:
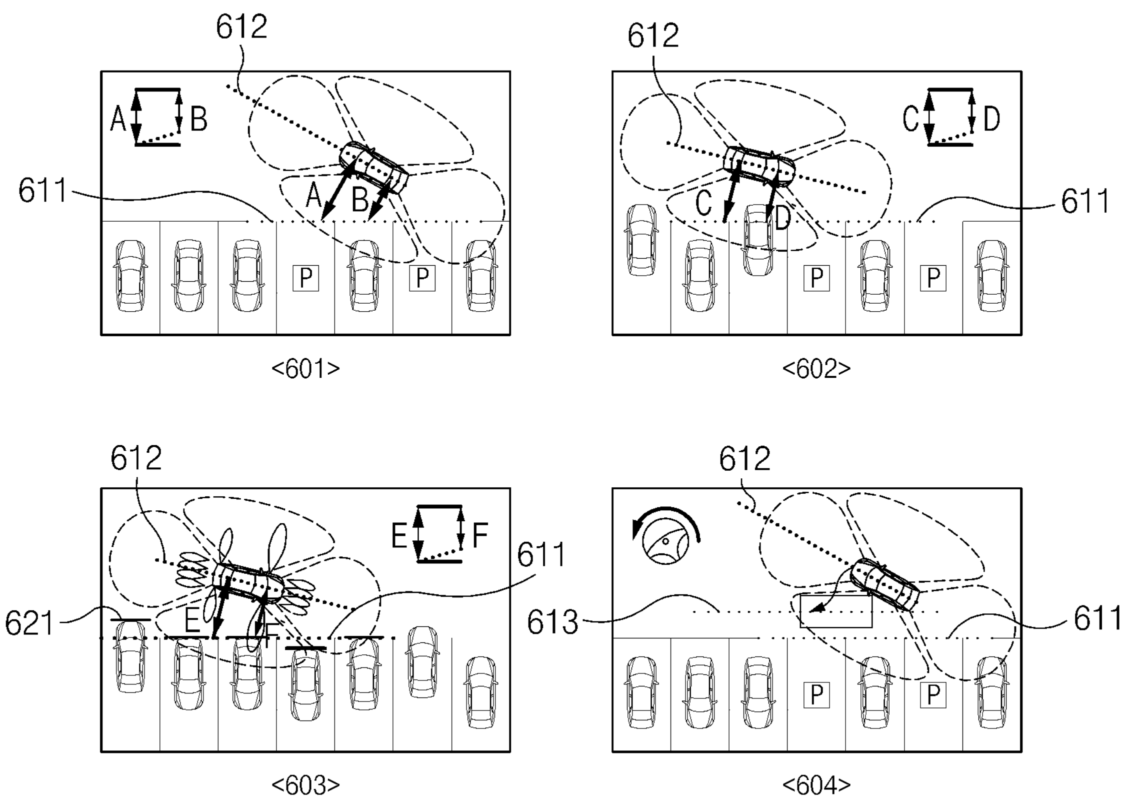
FIG. 6 is a view illustrating a process of detecting an angle for vehicle alignment and calculating an alignment angle according to an embodiment of the present disclosure.

FIG. 6 is a view illustrating a process of detecting an angle for vehicle alignment and calculating an alignment angle according to an embodiment of the present disclosure.

The parking control apparatus 100 may detect separation distances from the central axis of the vehicle, the front wheel axle, and the rear wheel axle to a reference line by using results obtained from the ultrasonic sensor 210 and the camera 220 of the sensing device 200. Furthermore, the parking control apparatus 100 may calculate the current angle, a required alignment angle, and a separation distance for vehicle alignment based on the separation distance between the central axis of the vehicle and the reference line, the separation distance between the front wheel axle of the vehicle and the reference line, and the separation distance between the rear wheel axle of the vehicle and the reference line.

Referring to <601> of FIG. 6, the separation distance A between the front wheel axle of the vehicle and a reference line 611, the separation distance B between the rear wheel axle of the vehicle and the reference line 611, and the angle between the central axis 612 of the vehicle and the reference line 611 are illustrated. The separation distance D between the front wheel axle of the vehicle and the reference line 611, the separation distance C between the rear wheel axle of the vehicle and the reference line 611, and the angle between the central axis 612 of the vehicle and the reference line are illustrated in <602> of FIG. 6. The separation distance F between the front wheel axle of the vehicle and the reference line 611, the separation distance E between the rear wheel axle of the vehicle and the reference line 611, and the angle between the central axis 612 of the vehicle and the reference line are illustrated in <603> of FIG. 6. For a search for a parking place, the parking control apparatus 100 may maintain a separation distance of 0.5 m (19.7 inches) to 1.5 m (59 inches) from parked vehicles and may set an optimal separation distance to 1 m (39.4 inches).

Referring to <604> of FIG. 6, an example of calculating, by the parking control apparatus 100, an optimal required steering angle according to the required separation distances and the alignment angle is illustrated.

The alignment angle refers to the angle between the central axis 612 of the vehicle and a line 613 drawn from the vehicle front wheel in a direction parallel to the reference line 611. The parking control apparatus 100 performs control such that the vehicle rear wheel is moved by the alignment angle and thus the vehicle is parallel to the reference line. The distance between the line 613, which is drawn from the vehicle front wheel in the direction parallel to the reference line 611, and the reference line 611 may be set to 1 m that is the optimal separation distance.

Figure 7:
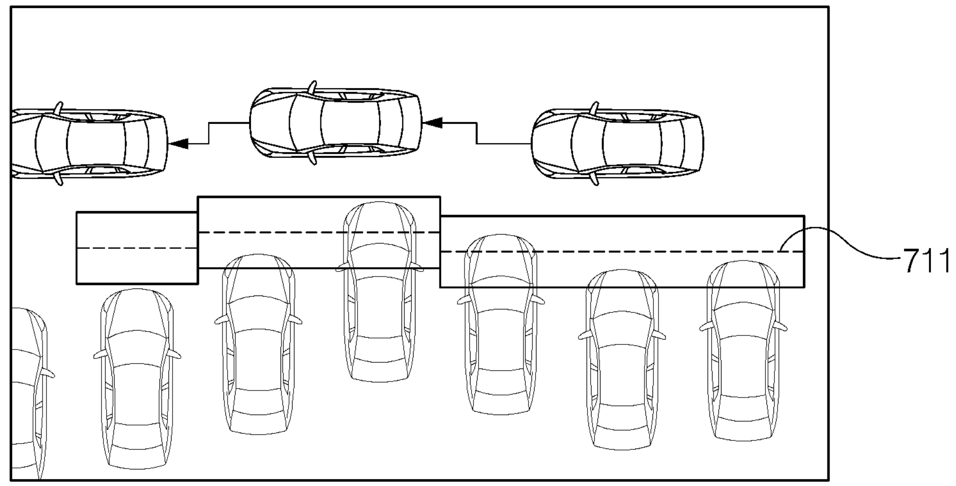
FIG. 7 is a view illustrating search driving according to an embodiment of the present disclosure.
Figure 7:
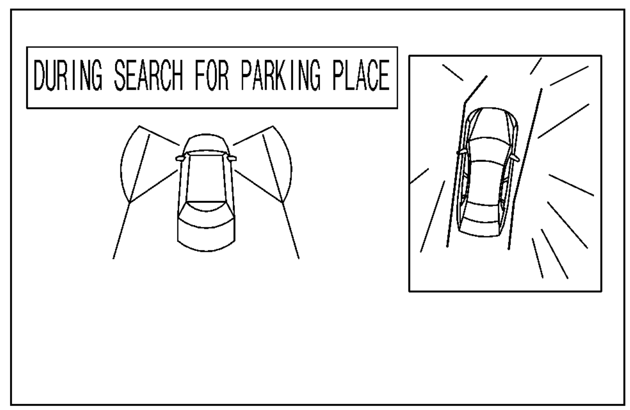

FIG. 7 is a view illustrating search driving according to an embodiment of the present disclosure.

Referring to <701> of FIG. 7, the parking control apparatus 100 controls the vehicle to perform search driving parallel to a reference line 711. Conditions for search driving are listed in Table 1 below.

TABLE 1

| | |
|---|---|
| Separation Distance | Perform driving while maintaining a distance of 1 m from a reference line. |
| Operation Specification | Guide an expected movement path on human machine interface (HMI). Perform steering control for satisfying a separation distance when a reference line is changed by a protruding vehicle or a surrounding environment. |
| Movement of Reference Line | Move a reference line by an excess length when a parked vehicle exceeds a band interval (0.5 m to 1.5 m). However, the reference line is not changed when it is determined that there is an obstacle. |

An example in which the parking control apparatus 100 displays an expected movement path as a top-view screen on the display 130 to reduce the user's psychological burden is illustrated in <702> of FIG. 7.

Figure 8:
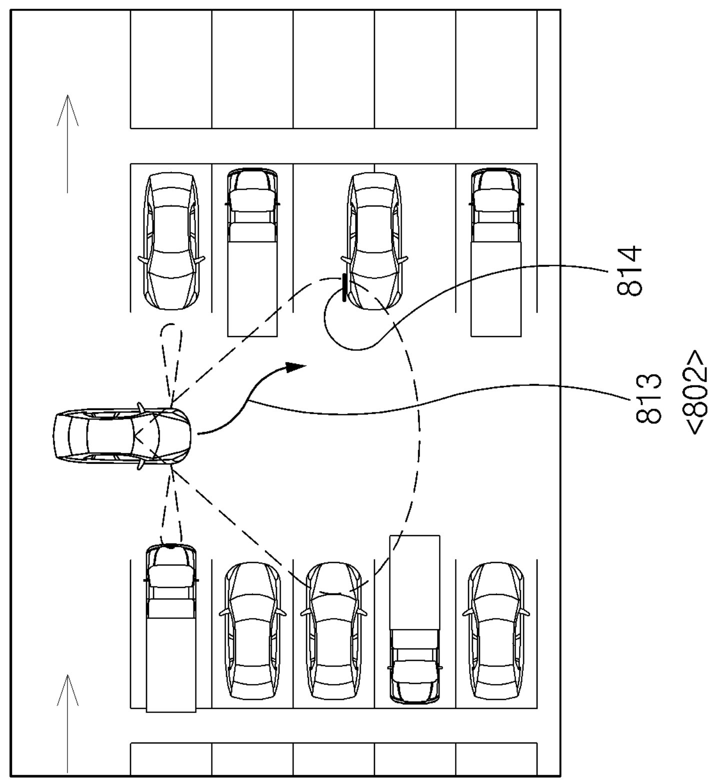
FIG. 8 is a view illustrating a parking place search path according to an embodiment of the present disclosure.
Figure 8:
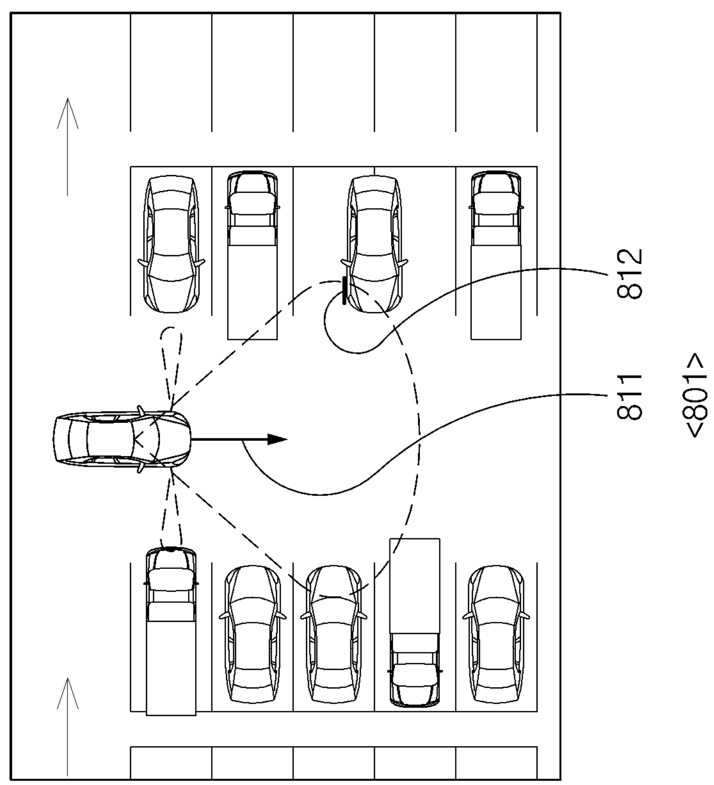

FIG. 8 is a view illustrating a parking place search path according to an embodiment of the present disclosure. Referring to FIG. 8, the parking control apparatus 100 determines a vacant parking place by detecting a wheel of a parked vehicle using a front camera and controls the vehicle to change a path 811 and perform search driving. As illustrated in <801> of FIG. 8, the parking control apparatus 100 detects the wheel (a circle 812) of a vehicle next to an empty place among parked vehicles and determines that the empty place is next to the area where the wheel (the circle) of the vehicle is detected. As illustrated in <802> of FIG. 8, the parking control apparatus 100 changes the parking path 811 to a parking path 813 directed toward the empty place.

Figure 9:
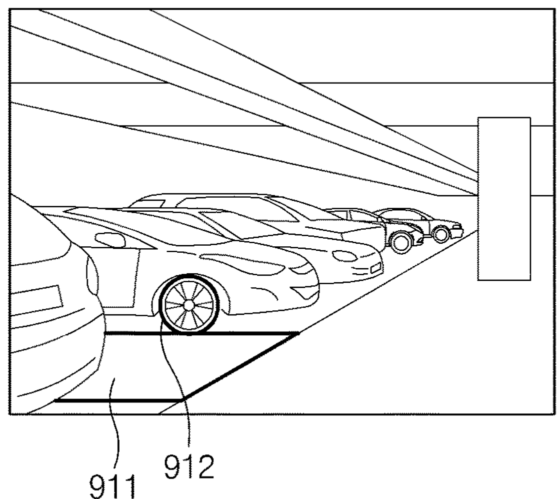
FIG. 9 is a view illustrating a process of determining a vacant parking place according to an embodiment of the present disclosure.
Figure 9:
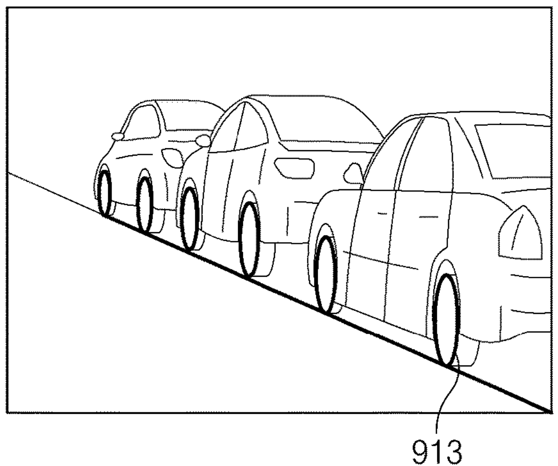

FIG. 9 is a view illustrating a process of determining a vacant parking place according to an embodiment of the present disclosure.

As illustrated in <901> of FIG. 9, when detecting two Y-axis parking lines 911 or a circle 912 and the angle (90 degrees) of a parking line, the parking control apparatus 100 may determine that the parking place is a perpendicular parking place. In the case where ellipses 913 are detected at constant intervals or more as illustrated in <902> of FIG. 9, the parking control apparatus 100 may determine that the parking place is a parallel parking place.

In the case where two Y-axis parking lines or a circle is detected and the angle of a parking line is 30 degrees, 45 degrees, 60 degrees, or a symmetric angle, the parking control apparatus 100 may determine that the parking place is an angle parking place. When a circle is detected due to the influence of a vacant place caused by a column, the parking control apparatus 100 may not recognize the vacant place as a parking place.

Figure 10:
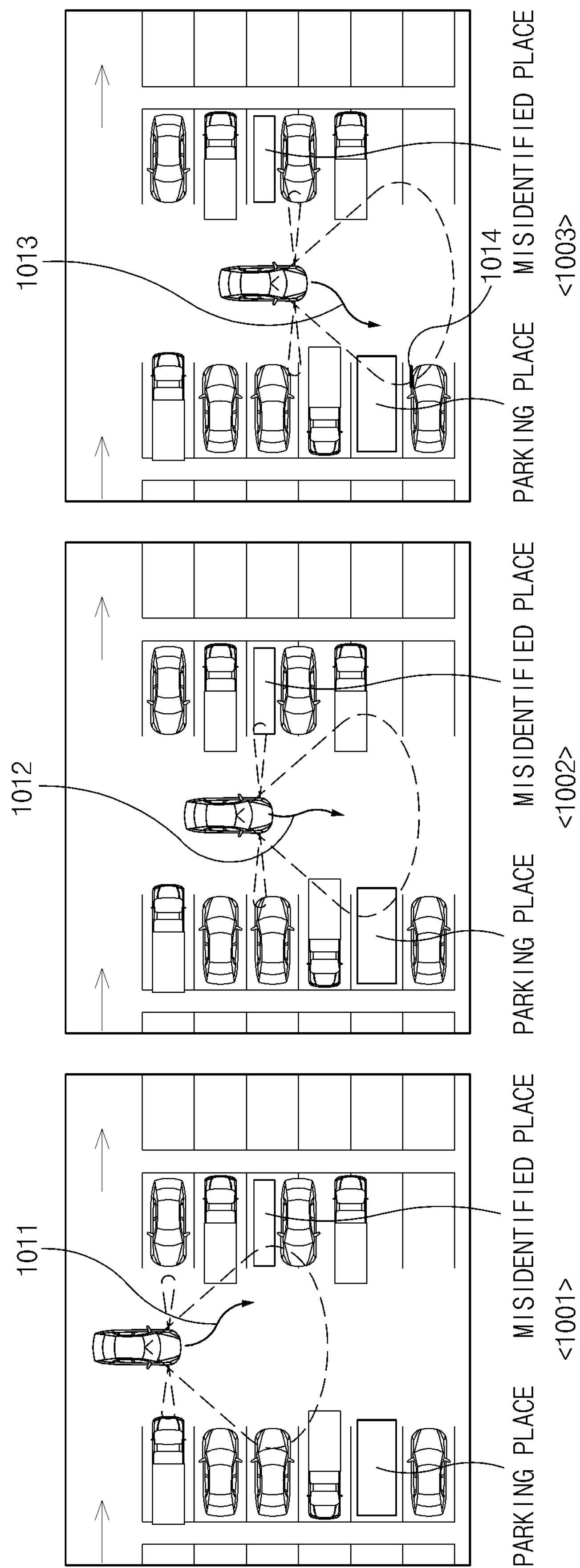
FIG. 10 is a view illustrating a countermeasure against misidentification of a vacant parking place according to an embodiment of the present disclosure.

FIG. 10 is a view illustrating a countermeasure against misidentification of a vacant parking place according to an embodiment of the present disclosure.

Referring to <1001> of FIG. 10, the parking control apparatus 100 determines a perpendicular parking place by detection of a circle and controls vehicle alignment and search driving for a search for a parking place (1011).

Referring to <1002> of FIG. 10, when a found parking place is determined to be an area (a misidentified area) where the vehicle cannot be parked, the parking control apparatus 100 outputs no parking place recognition result. When there is no additionally recognized place, the parking control apparatus 100 generates a path 1012 along which the vehicle travels in the middle of a road in the parking lot and controls the vehicle to move to the middle of the road. At this time, the parking control apparatus 100 may determine whether the vehicle is unable to be parked in the misidentified area, in the state in which the bumper of the vehicle is located at the end of a line of the misidentified area.

Referring to <1003> of FIG. 10, in the case where two Y-axis parking lines or a circle 1014 is detected while the vehicle travels in the middle of the road, the parking control apparatus 100 determines a place next to the two Y-axis parking lines or the circle 1014 to be a perpendicular parking place and performs vehicle alignment and search driving control for a search for a parking place (1013).

Figure 11:
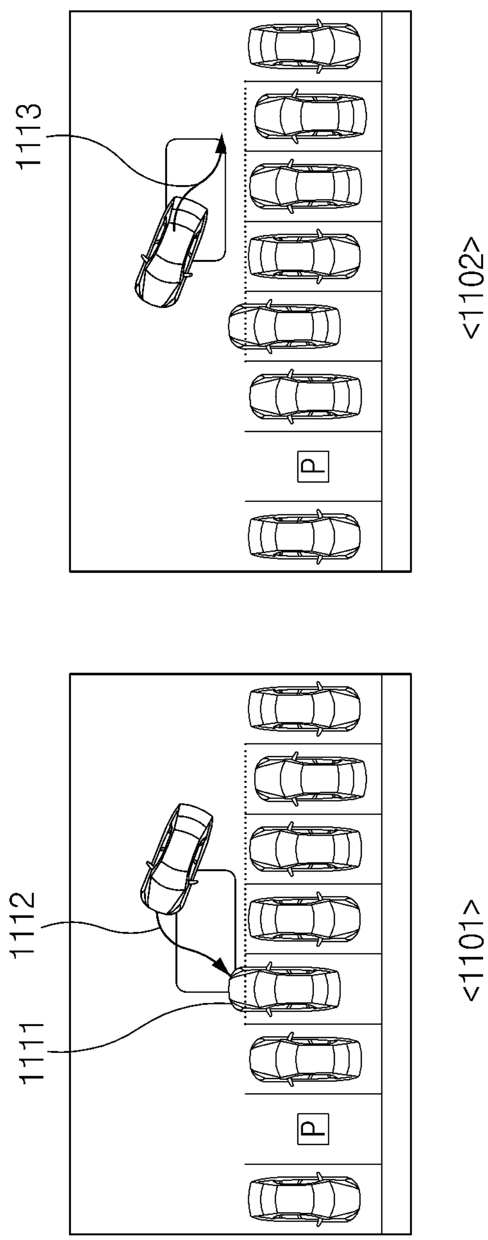
FIG. 11 is a view illustrating a process of recognizing an outgoing vehicle and changing a path during parking place search driving according to an embodiment of the present disclosure.

FIG. 11 is a view illustrating a process of recognizing an outgoing vehicle and changing a path during parking place search driving according to an embodiment of the present disclosure.

Referring to <1101> of FIG. 11, the parking control apparatus 100 recognizes an outgoing obstacle 1111 within a movement path 1112 based on the ultrasonic sensor 210 and the camera 220. The parking control apparatus 100 performs brake control when the obstacle 1111 is recognized. The parking control apparatus 100 recognizes a movement of the obstacle 1111 for a predetermined period of time by using the camera 220 and stands by when the obstacle 1111 moves. At this time, the parking control apparatus 100 may determine the movement of the obstacle 1111 through a distance value change and detection of a wheel of the vehicle that are recognized through the ultrasonic sensor and an image of the camera 220.

In the case where there is no movement of the obstacle, the parking control apparatus 100 changes the path 1112 of the vehicle to a vehicle path 1113 as illustrated in <1102> of FIG. 11. The parking control apparatus 100 may execute a scenario for an immovable state on the display 130 in the case where the path of the vehicle cannot be changed. In this embodiment, the scenario for the immovable state may include a step of performing a safety measure (e.g., engagement of P gear and engagement of an EPB) or moving to a search automation mode selection step screen after outputting a screen representing the immovable state on the display 130 for a predetermined period of time. At this time, the screen representing the immovable state may be displayed as illustrated in <1401> of FIG. 14.

Figure 12:
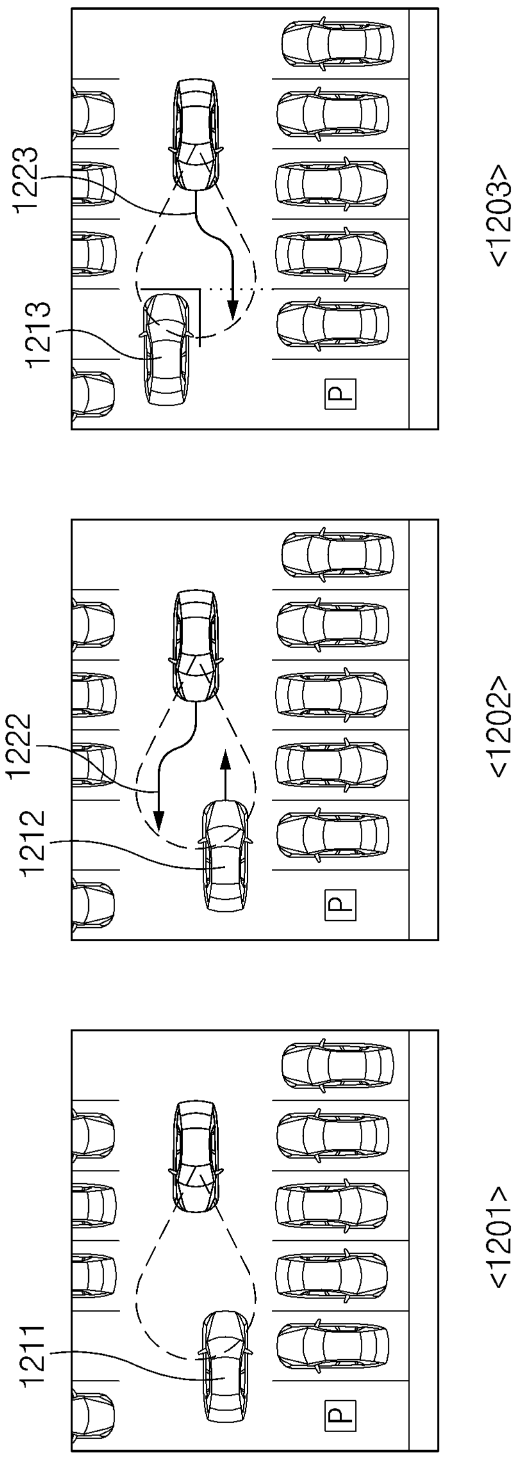
FIG. 12 is a view illustrating a process of recognizing a moving vehicle and changing a path during parking place search driving according to an embodiment of the present disclosure.

FIG. 12 is a view illustrating a process of recognizing a moving vehicle and changing a path during parking place search driving according to an embodiment of the present disclosure.

Referring to <1201> of FIG. 12, when recognizing an obstacle 1211 ahead while the vehicle moves, the parking control apparatus 100 may detect a movement of the obstacle 1211 based on the ultrasonic sensor 210 and the camera 220 after performing deceleration control.

As illustrated in <1202> of FIG. 12, when the obstacle is a dynamic obstacle 1212 that moves, the parking control apparatus 100 stands by after moving to a right path 1222 to evade the dynamic obstacle. At this time, the parking control apparatus 100 may not support a left evasion path and may perform a scenario for an immovable state when the vehicle cannot move.

Referring to <1203> of FIG. 12, when the obstacle is a static obstacle (1213) that does not move, the parking control apparatus 100 performs evasion driving control at a predetermined speed (3 kph (1.9 mph)) when evasion driving is possible. At this time, the parking control apparatus 100 may generate an evasion path 1223 by recognizing a corner point of the obstacle 1213 and may perform a scenario for an immovable state when the vehicle cannot move.

Figure 13:
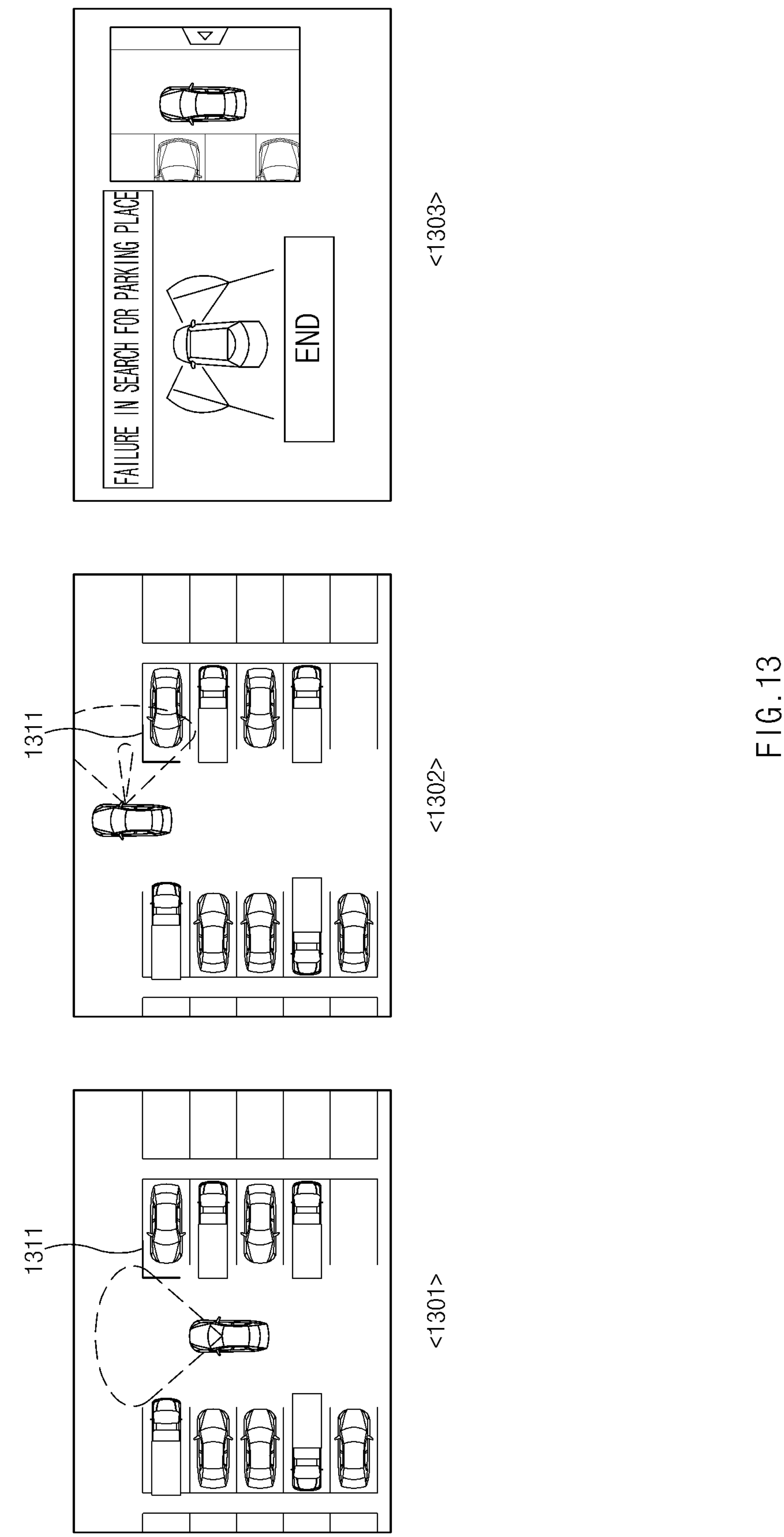
FIG. 13 is a view illustrating a process of recognizing a parking line end point and guiding a parking line search result according to an embodiment of the present disclosure.

FIG. 13 is a view illustrating a process of recognizing a parking line end point and guiding a parking line search result according to an embodiment of the present disclosure.

Referring to <1301> of FIG. 13, the parking control apparatus 100 performs control to reduce the speed of the vehicle when an end point 1311 of a parking line is detected through the camera 220.

Referring to <1302> of FIG. 13, the parking control apparatus 100 determines the end point by using a camera and an ultrasonic sensor installed on a side, recognizes the parking line at the end point, and informs of the end of the parking line through the display 130.

Referring to <1303> of FIG. 13, when failing to discover a parking place even though the vehicle reaches the end point of the parking line, the parking control apparatus 100 displays a parking place search failure result through the display 130. At this time, the parking control apparatus 100 may perform a safety measure (engagement of the P gear and an EPB), may display the parking place search failure result on a screen through the display 130 for a predetermined period of time (e.g., 4 seconds), and may switch the screen to an automatic search mode selection step screen.

Figure 14:
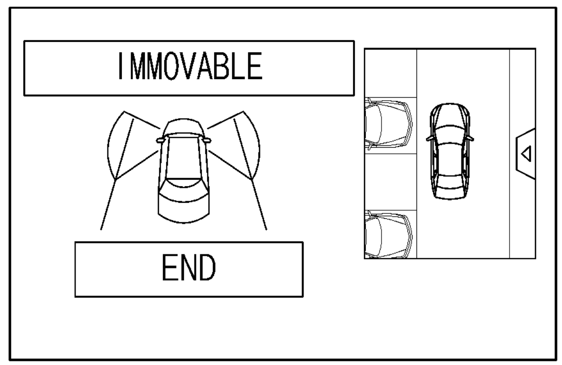
FIG. 14 is a view illustrating an immovable state and driver intervention during search driving according to an embodiment of the present disclosure.
Figure 14:
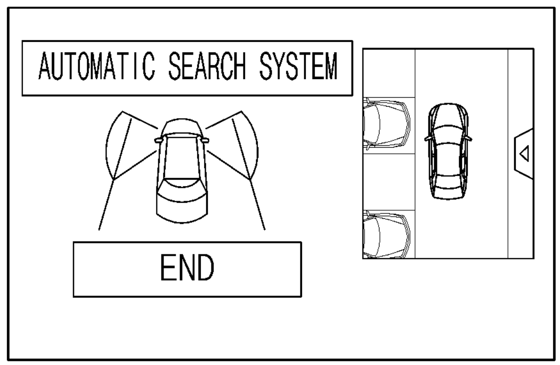

FIG. 14 is a view illustrating an immovable state and driver intervention during search driving according to an embodiment of the present disclosure.

In an immovable state, the parking control apparatus 100 may include a step of performing a safety measure (e.g., engagement of P gear and engagement of an EPB) or moving a search automation mode selection step screen after outputting a screen representing the immovable state on the display 130 for a predetermined period of time. At this time, the screen representing the immovable state may be displayed as illustrated in <1401> of FIG. 14.

An example of displaying a screen when the user intervenes is illustrated in <1402> of FIG. 14. When the user intervenes, the parking control apparatus 100 allows for a brake pedal input, ignores an accelerator pedal input, performs a safety measure in the case of steering intervention/gear shift/ultrasonic sensor off/RSPA switch input, outputs an automatic search mode end screen for a predetermined period of time, and performs initialization.

As described above, the parking control apparatus and method automatically searches for a parking place to reduce the user's burden of searching for the parking place and generates an optimal path for searching for the parking place. Thereby, the accuracy is improved when searching for a vacant parking place and the user's satisfaction and the reliability of the RSPA system are also increased.

Figure 15:
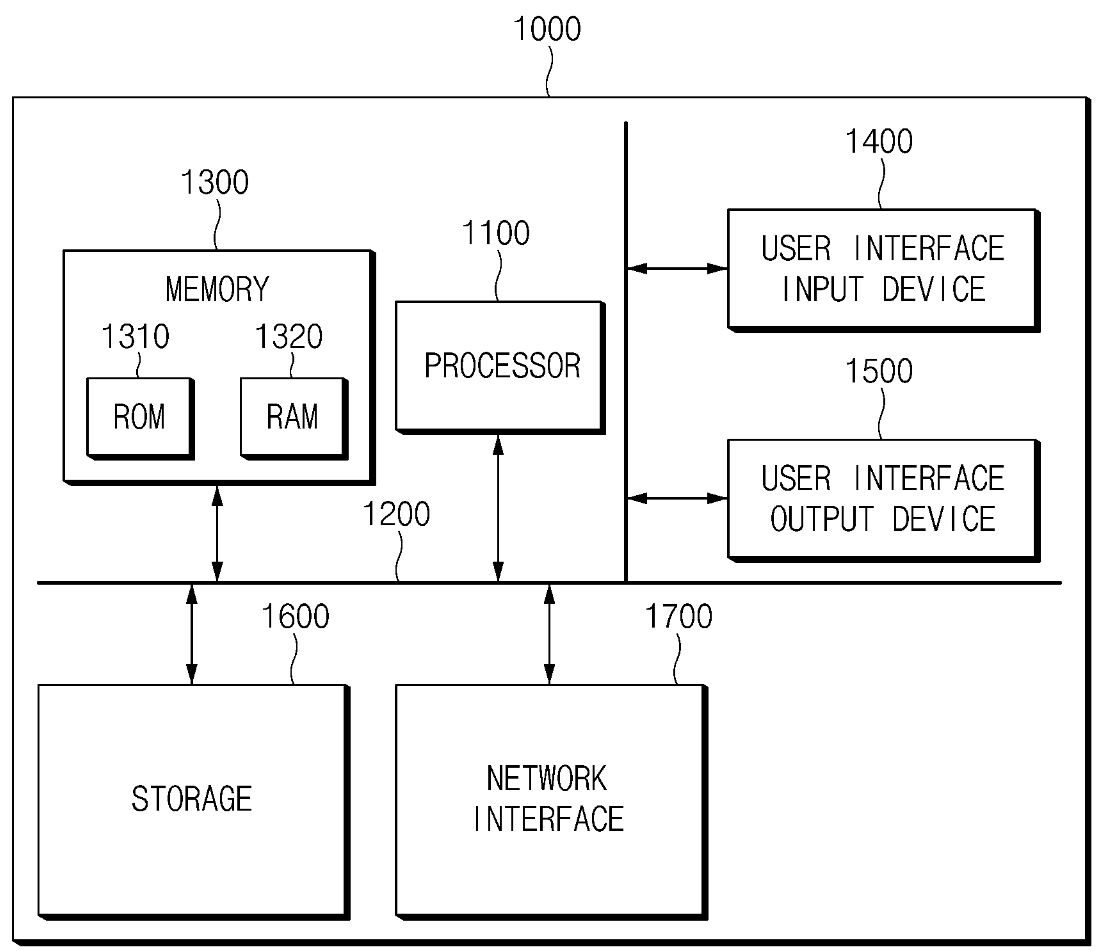
FIG. 15 illustrates a computing system according to an embodiment of the present disclosure.

FIG. 15 illustrates a computing system according to an embodiment of the present disclosure.

Referring to FIG. 15, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, or a CD-ROM.

The storage medium may be coupled to the processor 1100. The processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The technology according to the present disclosure may automate a search for a parking place, thereby increasing a user's satisfaction. The technology according to the present disclosure may also increase the accuracy when searching for a parking place, thereby improving the reliability of parking control technology.

In addition, the present disclosure may provide various effects that are directly or indirectly recognized.

Hereinabove, although the present disclosure has been described with reference to various embodiments and the accompanying drawings, the present disclosure is not limited thereto, but may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed based on the accompanying claims. All the technical ideas within the scope equivalent to the claims should be included in the scope of the present disclosure.

What is claimed is:

1. An apparatus for controlling parking of a vehicle, the apparatus comprising:

a processor configured to recognize a parking line or an object in a parking place, generate a reference line based on the parking line or the object, align the vehicle subject to the parking control based on the reference line, generate an expected driving path for a search for the parking place, and automatically search for the parking place while the vehicle travels based on the expected driving path;

a storage configured to store parking place information searched by the processor; and a display configured to output, for a predetermined period of time, a screen representing an immovable state and switch to and output an automatic parking place search mode screen, when a change into an evasion path is impossible, wherein the processor causes the vehicle to travel in the middle of a road during driving control for a search for the parking place and continues to perform the driving control by changing a path to a path for evading an obstacle, when the obstacle is recognized, and wherein the processor ends an automatic parking place search mode and performs engagement of a parking (P) gear and engagement of an electronic parking brake (EPB), in response to a determination that the obstacle does not move and that the change into an evasion path is impossible.

2. The apparatus of claim 1, wherein the processor generates a virtual parking line by detecting an edge of a Y-axis parking line and aligns the vehicle subject to the parking control based on the virtual parking line, when an X-axis parking line is not recognized and the Y-axis parking line is recognized.

3. The apparatus of claim 1, wherein the processor recognizes bumper lines of parked vehicles, generates the reference line based on the bumper lines of the vehicles, and aligns the vehicle subject to the parking control based on the reference line, when an X-axis parking line is not recognized.

4. The apparatus of claim 3, wherein the processor generates a middle line position relative to the bumper lines of the parked vehicles as the reference line.

5. The apparatus of claim 1, wherein the processor calculates a separation distance between the vehicle subject to the parking control and the parking line and a required alignment angle for aligning the vehicle subject to the parking control, calculates a required steering angle according to the separation distance and the required alignment angle, and controls the alignment of the vehicle subject to the parking control according to the required steering angle.

6. The apparatus of claim 1, wherein the processor performs control such that the vehicle subject to the parking control searches for the parking place while travelling parallel to the parking line.

7. The apparatus of claim 1, further comprising:

a display configured to display an expected movement path generated by the processor on a screen during the travel of the vehicle subject to the parking control.

8. The apparatus of claim 1, wherein the processor determines a parking mode of a vacant parking place by using at least one of the number of parking lines detected, whether an ellipse is detected or not, and an angle of a parking line.

9. The apparatus of claim 1, wherein the processor determines whether the obstacle moves, causes the vehicle subject to the parking control to stand by in response to a determination that the obstacle moves, and performs driving control of the vehicle subject to the parking control along the path for evading the obstacle, in response to a determination that the obstacle does not move.

10. The apparatus of claim 1, wherein the processor recognizes a failure in the automatic parking place search, in response to a determination that an end point of a parking line is recognized during driving control for a search for the parking place, and wherein the display displays a screen representing the failure in the automatic parking place search.

11. The apparatus of claim 1, wherein the processor:

determines an empty place among parking places based on detection of a circle, generates a driving path toward the empty place, moves toward the empty place by tracking the driving path, and determines whether the empty place is an available parking area; and generates a path along which the vehicle travels in the middle of a road and searches for the parking place while the vehicle travels in the middle of the road along the path, in response to a determination that the empty place is an area where the vehicle cannot be parked.

12. A vehicle system comprising:

a sensing device configured to sense a parking place and a parking line; and a parking control apparatus configured to recognize the parking line of the parking place, generate a reference line based on the parking line, align a vehicle subject of parking control based on the reference line, generate an expected driving path for a search for the parking place, and automatically search for the parking place based on the expected driving path, wherein the parking control apparatus includes a display configured to output, for a predetermined period of time, a screen representing an immovable state and switch to and output an automatic parking place search mode screen, when a change into an evasion path is impossible, wherein the parking control apparatus causes the vehicle to travel in the middle of a road during driving control for a search for the parking place and continues to perform the driving control by changing a path to a path for evading an obstacle, when the obstacle is recognized, and wherein the parking control apparatus ends an automatic parking place search mode and performs engagement of a parking (P) gear and engagement of an electronic parking brake (EPB), in response to a determination that the obstacle does not move and that the change into an evasion path is impossible.

13. A method for controlling parking of a vehicle, the method comprising:

recognizing a parking line of a parking place;

generating a reference line based on the parking line and aligning the vehicle subject to the parking control based on the reference line;

generating an expected driving path for a search for the parking place;

automatically searching for the parking place based on the expected driving path;

outputting for a predetermined period of time, a screen representing an immovable state and switching to and outputting an automatic parking place search mode screen, when a change into an evasion path is impossible;

performing driving control by changing a path to a path for evading an obstacle, when the obstacle is recognized during the driving control for the parking place search;

ending an automatic parking place search mode; and performing engagement of a parking (P) gear and engagement of an electronic parking brake (EPB), in response to a determination that the obstacle does not move and that the change into an evasion path is impossible.

14. The method of claim 13, wherein the recognizing of the parking line of the parking place includes:

generating a virtual parking line by detecting an edge of a Y-axis parking line, and generating the virtual parking line as the reference line, when an X-axis parking line is not recognized and the Y-axis parking line is recognized.

15. The method of claim 13, wherein the recognizing of the parking line of the parking place includes:

recognizing bumper lines of parked vehicles and generating a reference line based on the bumper lines of the vehicles, when an X-axis parking line is not recognized.

16. The method of claim 13, wherein the aligning of the vehicle subject to the parking control includes:

calculating a separation distance between the vehicle subject to the parking control and the parking line and a required alignment angle for aligning the vehicle subject to the parking control, calculating a required steering angle according to the separation distance and the required alignment angle, and controlling the alignment of the vehicle subject to the parking control according to the required steering angle.

* * * * *